US012566985B2

(12) United States Patent
    Cv et al.

(10) Patent No.: US 12,566,985 B2
(45) Date of Patent: Mar. 3, 2026

(54) METHOD AND SYSTEM FOR PERFORMING DATA PREDICTION

(71) Applicant: Dell Products L.P., Round Rock, TX (US)

(72) Inventors: Raghavendra Rao Cv, Bangalore (IN); Rajkumar Dan, Bangalore (IN); Priyanka Ganguly, Bangalore (IN); Dilip Kumar S, Bangalore (IN); Hariraj Ramakrishnan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 980 days.

(21) Appl. No.: 17/687,329

(22) Filed: Mar. 4, 2022

(65) Prior Publication Data

US 2023/0281494 A1    Sep. 7, 2023

(51) Int. Cl.
    *G06N 7/01*        (2023.01)
    *G06N 20/20*       (2019.01)
(52) U.S. Cl.
    CPC .............. *G06N 7/01* (2023.01); *G06N 20/20* (2019.01)
(58) Field of Classification Search
    CPC .................................. G06N 7/01; G06N 20/20
    See application file for complete search history.

(56) References Cited

U.S. PATENT DOCUMENTS

| | | | | |
|---|---|---|---|---|
| 2005/0234753 A1* | 10/2005 | Pinto | ...................... | G06Q 10/04 |
| | | | | 700/44 |
| 2018/0033079 A1* | 2/2018 | Porter | ................ | G06Q 10/0631 |
| 2021/0158197 A1* | 5/2021 | Costello | ................. | G06N 20/20 |
| 2022/0245511 A1* | 8/2022 | Perian | ................... | G06F 16/285 |
| 2022/0326699 A1* | 10/2022 | Murai | ................... | G05B 23/024 |
| 2023/0096633 A1* | 3/2023 | Thayaparan | ........ | G06F 18/2148 |
| | | | | 705/348 |
| 2023/0206150 A1* | 6/2023 | Chan | ...................... | G06Q 50/12 |
| | | | | 705/7.25 |

FOREIGN PATENT DOCUMENTS

KR       20230049347 A  *  4/2023   ....... G06Q 10/06375

OTHER PUBLICATIONS

Tumeo, M.A. (1994). The Meaning of Stochasticity, Randomness and Uncertainty in Environmental Modeling. In: Hipel, K.W. (eds) Stochastic and Statistical Methods in Hydrology and Environmental Engineering. Water Science and Technology Library, vol. 10/4. Springer, Dordrecht. (Year: 1994).*

(Continued)

*Primary Examiner* — James T Tsai
(74) *Attorney, Agent, or Firm* — Chamberlain, Hrdlicka, White, Williams & Aughtry; Aly Z. Dossa

(57)        ABSTRACT
A method for performing data prediction includes: obtaining a dataset; generating prediction parameters using the dataset; identifying significant variables in the dataset; predicting seasonality of the dataset based on the significant variables; determining uncertainty of the prediction parameters; performing the data prediction by minimizing randomness and uncertainty of the dataset; and displaying the data prediction on a graphical user interface.

17 Claims, 6 Drawing Sheets

(56) References Cited

OTHER PUBLICATIONS

Erdik, T., Pektas, A.O. Rock slope damage level prediction by using multivariate adaptive regression splines (MARS). Neural Comput & Applic 31, 2269-2278 (2019). https://doi.org/10.1007/s00521-017-3186-2 (Year: 2019).*

Chaudhry, Aizaz, Li, Wei, Basri, Amir, Patenaude, François, A Method for Improving Imputation and Prediction Accuracy of Highly Seasonal Univariate Data with Large Periods of Missingness, Wireless Communications and Mobile Computing, 2019, 4039758, 13 pages, 2019. (Year: 2019).*

Gude, V., Corns, S., & Long, S. (2020). Flood Prediction and Uncertainty Estimation Using Deep Learning. Water, 12(3), 884. https://doi.org/10.3390/w12030884 (Year: 2020).*

* cited by examiner

System
100

FIG. 2.1

Identification Module
206

Linear Fitting Model
212

Predictor Model
214

FIG. 2.2

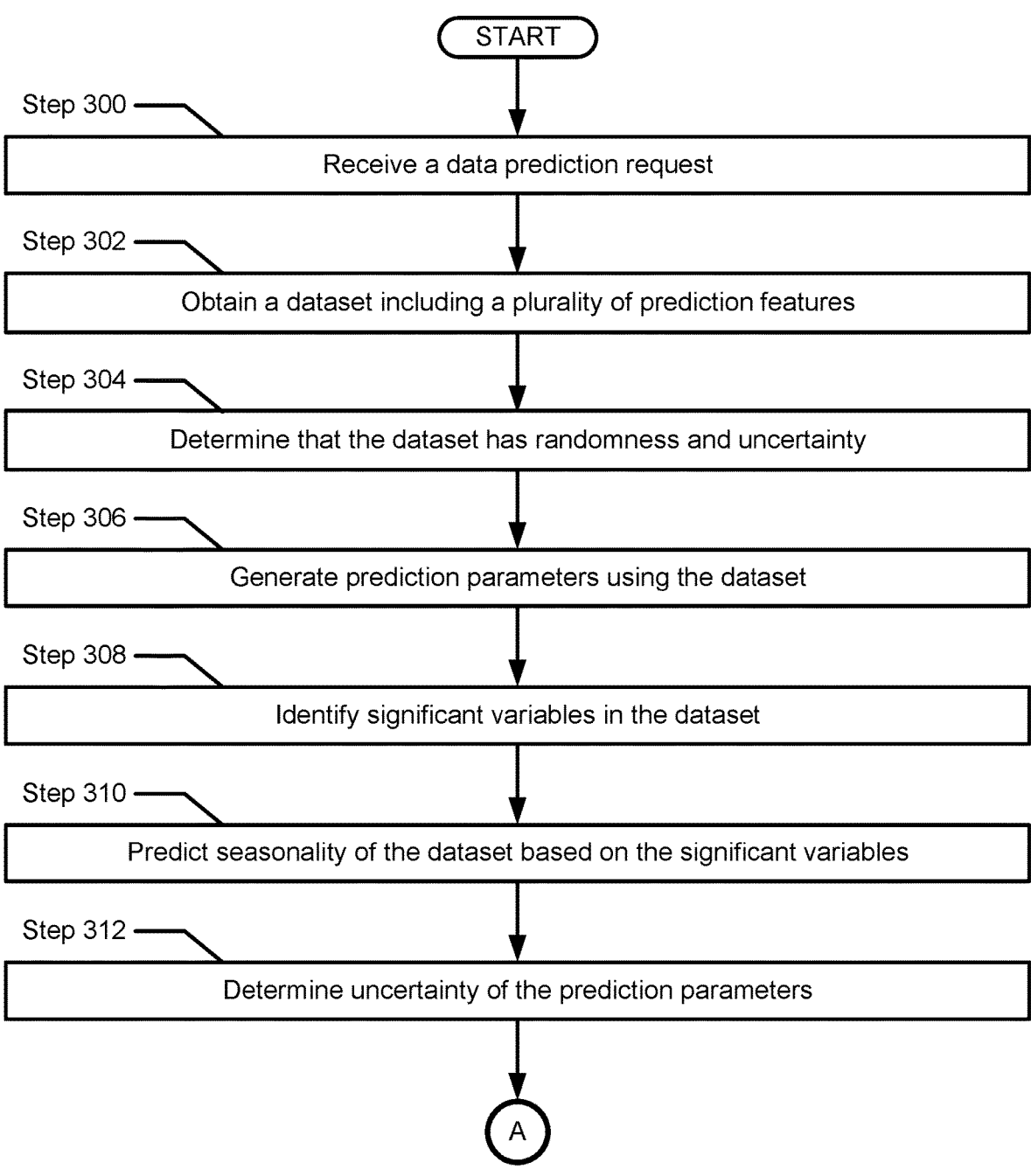

START

Step 300

Receive a data prediction request

Step 302

Obtain a dataset including a plurality of prediction features

Step 304

Determine that the dataset has randomness and uncertainty

Step 306

Generate prediction parameters using the dataset

Step 308

Identify significant variables in the dataset

Step 310

Predict seasonality of the dataset based on the significant variables

Step 312

Determine uncertainty of the prediction parameters

Step 314

Perform the data prediction by minimizing randomness and uncertainty of the dataset Step 316

Display the data prediction on a graphical user interface

END

FIG. 3.2

METHOD AND SYSTEM FOR PERFORMING DATA PREDICTION

BACKGROUND

Heuristic models can be used to generate forecasts (i.e., predictions) for a dataset tracking a specific event (e.g., changes in accounts receivable). In most cases, the heuristic models are unstable and incapable of identifying data randomness, significant data patterns, and seasonality of the dataset.

BRIEF DESCRIPTION OF DRAWINGS

Certain embodiments disclosed herein will be described with reference to the accompanying drawings. However, the accompanying drawings illustrate only certain aspects or implementations of one or more embodiments disclosed herein by way of example, and are not meant to limit the scope of the claims.

FIG. 2.2 shows a diagram of an identification module in accordance with one or more embodiments disclosed herein.

DETAILED DESCRIPTION

Figure 1:
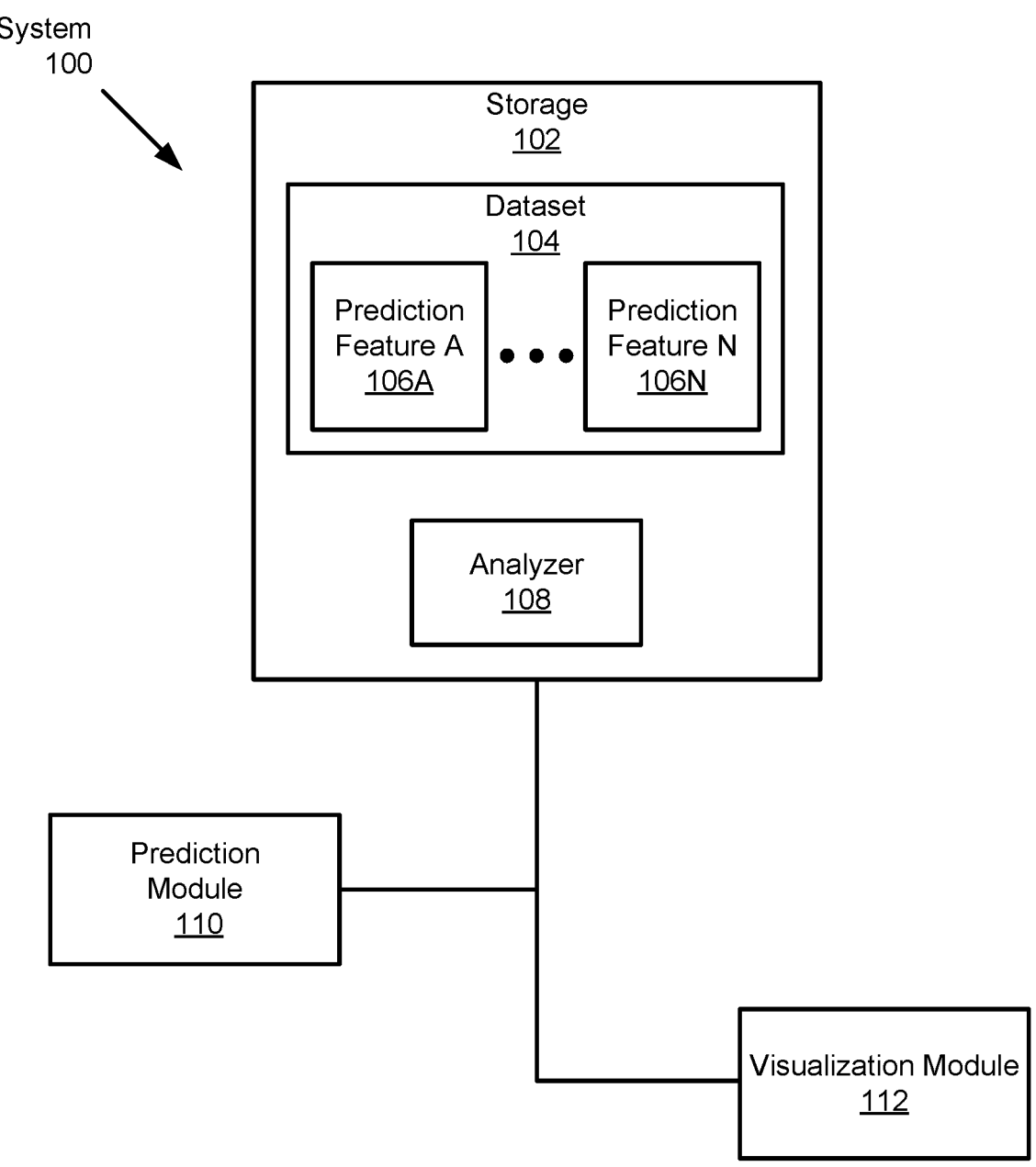
FIG. 1 shows a diagram of a system in accordance with one or more embodiments disclosed herein.

Specific embodiments disclosed herein will now be described in detail with reference to the accompanying figures. In the following detailed description of the embodiments disclosed herein, numerous specific details are set forth in order to provide a more thorough understanding of one or more embodiments disclosed herein. However, it will be apparent to one of ordinary skill in the art that the embodiments disclosed herein may be practiced without these specific details. In other instances, well-known features have not been described in detail to avoid unnecessarily complicating the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

Embodiments disclosed herein relate to a method and system for performing data prediction. More specifically, various embodiments disclosed herein may obtain a dataset, which includes a plurality of prediction features, in response to receiving a data prediction request. A prediction parameter engineering module then generates prediction parameters using the dataset, and an identification module identifies significant variables in the dataset and predicts seasonality of the dataset based on the significant variables. A posterior probability prediction module then determines an uncertainty of the prediction parameters. Finally, an optimization module performs the data prediction by minimizing randomness and uncertainty of the dataset, and the data prediction is displayed to a user on a graphical user interface. By utilizing the optimization module and by identifying the significant variables in the dataset, one or more embodiments disclosed herein, advantageously provide more robust and stable data prediction results with lower error rates. This is a direct improvement over using heuristic models, which are unstable and incapable of identifying data randomness, significant data patterns, and seasonality of the dataset.

The following describes various embodiments disclosed herein.

FIG. 1 shows a diagram of a system in accordance with one or more embodiments disclosed herein. The system (100) includes storage (102), a prediction module (110), and a visualization module (112). In one or more embodiments disclosed herein, the system (100) may be part of a computing device (e.g., 400, FIG. 4). The system (100) may include additional, fewer, and/or different components without departing from scope of the embodiments disclosed herein. Each component may be operably connected to any of the other component via any combination of wired and/or wireless connections. Each component illustrated in FIG. 1 is discussed below.

As shown in FIG. 1, the system (100) includes the storage (102), which may be persistent storage, volatile storage, or any combination thereof. In one or more embodiments disclosed herein, the storage (102) is configured to store a dataset (104) comprising a plurality of prediction features (prediction feature A (106A), prediction feature N (106N)), and an analyzer (108). The dataset (104) may be any type of data structure (e.g., one or more lists, tables, collection of data values, etc.) storing historical time series data on one or more real world events and/or processes. For example, the dataset (104) may be related to a merchant's (e.g., a company, business, individual, etc.) accounts receivables.

In one or more embodiments disclosed herein, each prediction feature (prediction feature A (106A), prediction feature N (106N)) of the dataset (104) may be an individual time series (e.g., a series of data points that are indexed, listed, or graphed based on time). Each individual time series may represent a feature and/or element that affects (i.e., play a role in) the real world event and/or process demonstrated by the dataset (104). For example, in the above example where the dataset (104) is related to the account receivables, one of the prediction features (prediction feature A (106A), prediction feature N (106N)) may be a time series showing weekly pay dates of customers. As another example, assuming that the dataset (104) is related to the field of demand prediction, the prediction features (prediction feature A (106A), prediction feature N (106N)) may include information regarding past and future promotion plans and/or schedule of special events (e.g., quarterly earnings report postings, holidays, etc.).

In one or more embodiments disclosed herein, the prediction features (prediction feature A (106A), prediction feature N (106N)) may also illustrate historical data (e.g., trend, lag, seasonality, etc.) of the time series. All of the prediction features (prediction feature A (106A), prediction feature N (106N)) may be used during the generation of a future prediction of the dataset (104). Each of the prediction features (prediction feature A (106A), prediction feature N (106N)) may also have different effects on the future prediction of the dataset (104).

In one or more embodiments disclosed herein, the analyzer (108) may run a statistical model or a statistical test (e.g., Augmented Dickey Fuller (ADF) test) to determine whether the data (104) is stationary. Although the analyzer (108) is shown as part of the storage (102), those skilled in the art will appreciate that the analyzer may also be implemented separately in the form of hardware (e.g., circuitry), software, or any combination thereof similar to the prediction module (110) and visualization module (112).

In one or more embodiments disclosed herein, the analyzer (108) may be implemented as a logical device. The logical device may utilize the computing resources of any number of computing devices (e.g., 400, FIG. 4) to provide the functionality of the analyzer (108) described throughout this application (e.g., all, or a portion thereof, of the method illustrated in FIGS. 3.1 and 3.2).

Figure 3:
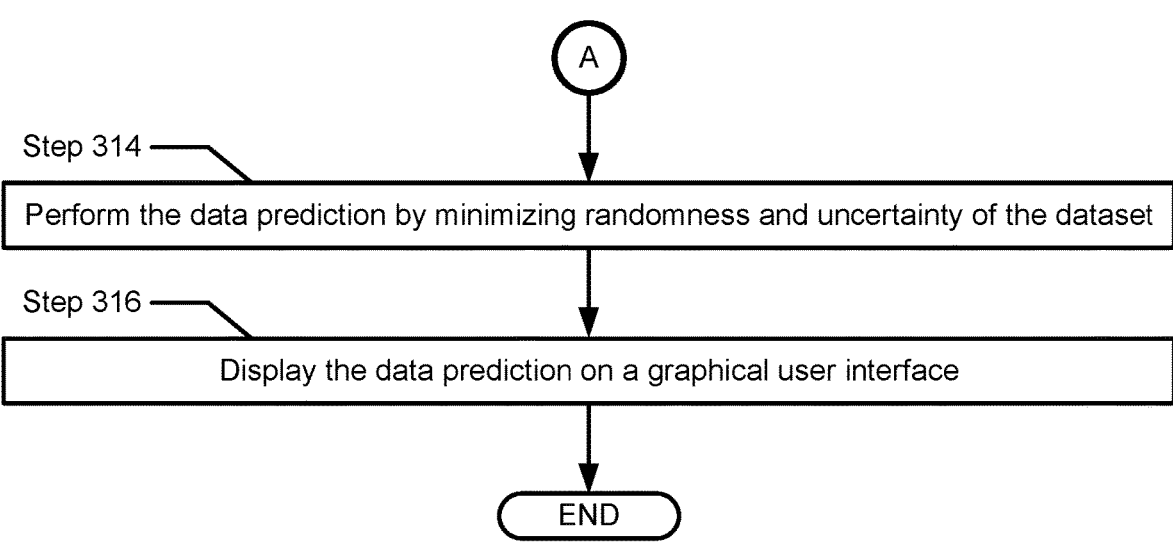
FIGS. 3.1 and 3.2 show a method to perform data prediction in accordance with one or more embodiments disclosed herein.
Figure 4:
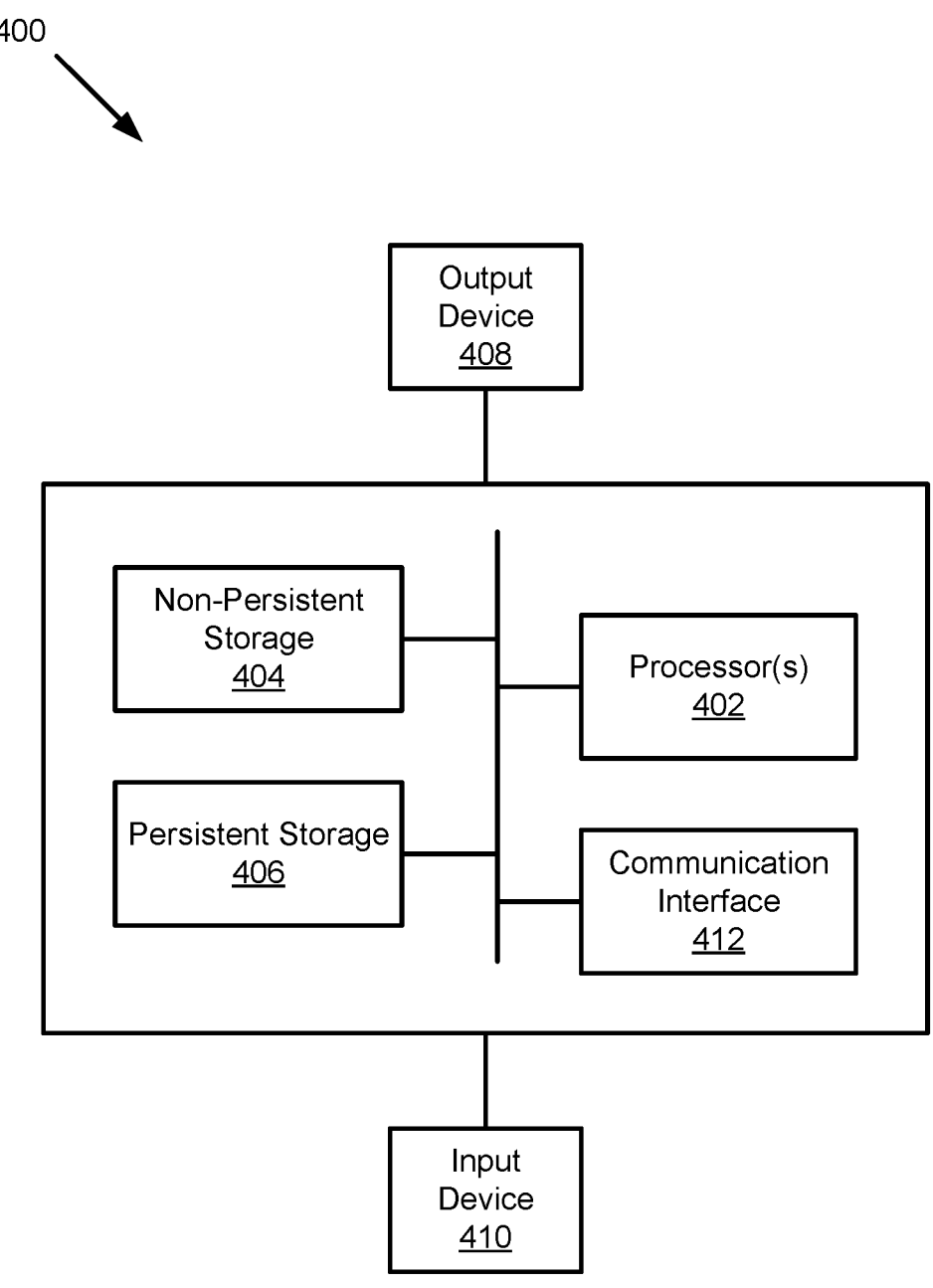
FIG. 4 shows a diagram of a computing device in accordance with one or more embodiments disclosed herein.

In one or more embodiments disclosed herein, the prediction module (110) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the prediction module (110) described throughout this application (e.g., all, or a portion thereof, of the method illustrated in FIGS. 3.1 and 3.2). Additional details regarding the prediction module are described below in reference to FIGS. 2.1 and 2.2.

Alternatively, in one or more embodiments disclosed herein, similar to the analyzer (108), the prediction module (110) may also be implemented as a logical device, as discussed above.

In one or more embodiments disclosed herein, the visualization module (112) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the visualization module (112) described throughout this application (e.g., all, or a portion thereof, of the method illustrated in FIGS. 3.1 and 3.2).

More specifically, the visualization module (112) may be configured to execute, for example, a generation of one or more prediction feature visualization outputs using one or more information (i.e., data) from the prediction features (prediction feature A (106A), prediction feature N (106N)) of the dataset (104). The visualization module (112) may also be configured to generate a future prediction of the dataset (104), which may be displayed to a user on a graphical user interface (GUI).

In one or more embodiments disclosed herein, each of the one or more prediction feature visualization outputs may be visual tools (e.g., a chart, a graph, a picture, etc.) that illustrates the effects of the prediction features (prediction feature A (106A), prediction feature N (106N)) on the data prediction.

Those skilled in the art will appreciate that while the above examples are taken into account to describe the functionality of the visualization module (112), the visualization module (112) may be used to display any step of the method illustrated in FIGS. 3.1 and 3.2 without departing from the scope of the embodiments disclosed herein.

Alternatively, in one or more embodiments disclosed herein, similar to the analyzer (108), the visualization module (112) may also be implemented as a logical device, as discussed above.

Turning back to the prediction module (110), in one or more embodiments disclosed herein, the prediction module (110) may be configured to receive requests to generate a prediction model (e.g., a machine learning (ML) model) for the dataset (104). The prediction model may include one or more predictions of the dataset and at least one of the prediction feature visualization outputs.

In one or more embodiments disclosed herein, the requests to the prediction module may be received from a GUI. The GUI may be configured to allow a user to select the dataset (104) and to configure the analyzer (108) and the prediction module (110) to generate the prediction model for the dataset. The GUI (not shown) may also include options for the user to select one or more of the prediction features (prediction feature A (106A), prediction feature N (106N)).

In one or more embodiments disclosed herein, in response to receiving the requests to generate the prediction model, the prediction module (110) may cause the visualization module (112) to generate the one or more prediction feature visualization outputs selected by the user. For example, the prediction module (110) may parse the received requests for information directed to the selected prediction features (prediction feature A (106A), prediction feature N (106N)). This information is then transferred to the visualization module (112) to generate the intended prediction feature visualization outputs.

In one or more embodiments disclosed herein, the functionality of each component described above may be divided into components or combined into a single component (e.g., the functionalities of the prediction module (110) and of the visualization module (112) may be combined to be implemented by a single component). Further, each component described above may be utilized multiple times to perform an iterative operation.

Figure 2:
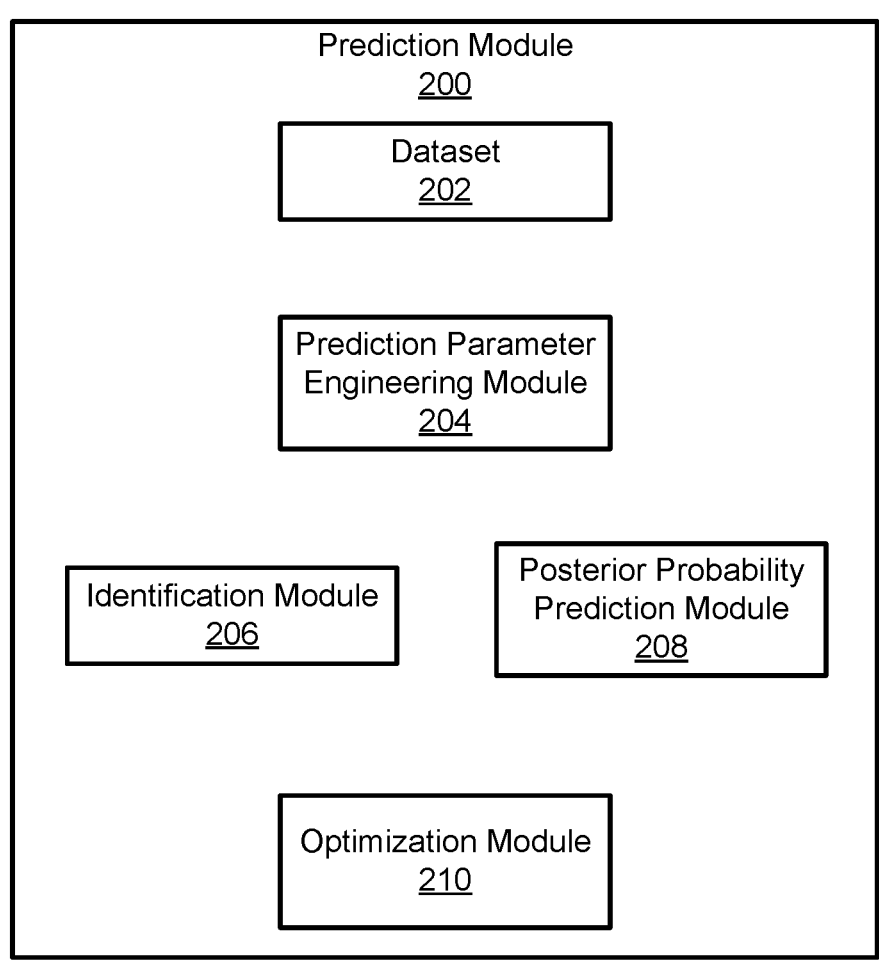
FIG. 2.1 shows a diagram for performing data prediction in accordance with one or more embodiments disclosed herein.

Turning now to FIG. 2.1, FIG. 2.1 shows a diagram of an example prediction module (200) in accordance with one or more embodiments disclosed herein. The example prediction module (200) may be the same as the prediction module (110) as discussed above in reference to FIG. 1. In one or more embodiments disclosed herein, the example prediction module (200) may include a dataset (202), a prediction parameter engineering module (204), an identification module (206), a posterior probability prediction module (208), and an optimization module (210). In one or more embodiments disclosed herein, the dataset (202) may be the same as the dataset (104) as discussed above in reference to FIG. 1. The example prediction module (200) may include additional, fewer, and/or different components without departing from the scope of the embodiments disclosed herein.

In one or more embodiments disclosed herein, based on a request (e.g., a data prediction performance request) received from the user, a prediction parameter engineering module (204) obtains a dataset (202) (e.g., accounts receivables, past due data, etc.) to generate prediction parameters using the dataset (202). In one or more embodiments disclosed herein, the prediction parameters may include, but they are not limited to: region, sub-region, time-based accounts receivables (AR_time), time-based accounts receivables difference (AR_diff), etc. In one or more embodiments disclosed herein, the AR_time may be generated as a multiplicative factor to specify hidden patterns inside the dataset.

In one or more embodiments disclosed herein, the time factor for the generation of AR_time and AR_diff prediction parameters may be set as weekly to capture underlying data patterns (e.g., uncertainties, randomness, etc.) and seasonality of the dataset. In one or more embodiments disclosed herein, setting a time factor for the generation of AR_time and AR_diff may advantageously capture the underlying data patterns and the seasonality of the dataset with more precision.

Those skilled in the art will appreciate that while the time factor for the generation of AR_time and AR_diff prediction parameters is set as weekly, any other time factor (e.g., daily, monthly, etc.) may be set for the generation of AR_time and AR_diff prediction parameters without departing from the scope of the embodiments disclosed herein.

In one or more embodiments disclosed herein, the prediction parameter engineering module (204) provides the generated prediction parameters to the identification module (206) and the posterior probability prediction module (208). In one or more embodiments disclosed herein, the identification module (206) may include a machine learning (ML) model (e.g., a linear fitting model (e.g., 212 to be discussed below in FIG. 2.2)), which operates in conjunction with other functions of the identification module (e.g., a predictor model (e.g., 214 to be discussed below in FIG. 2.2)). In one or more embodiments disclosed herein, the predictor model (e.g., 214, FIG. 2.2) may be (or may be configured to execute) an extreme gradient boost (XGBoost) model. Additional details regarding the linear fitting model (e.g., 212, FIG. 2.2) and the predictor model (e.g., 214, FIG. 2.2) are described below in reference to FIG. 2.2.

Next, in one or more embodiments disclosed herein, the posterior probability prediction module (208) may include (or may be configured to execute) a statistical approach model (e.g., Bayesian model averaging (BMA)) for determining uncertainty of the prediction parameters. In one or more embodiments disclosed herein, as an extension of a conventional Bayesian interference method, the BMA approach runs several prediction models (i.e., ensemble of prediction models) and takes an average of the prediction models based on their calculated weights (i.e., posterior probabilities of the prediction models). In one or more embodiments disclosed herein, using a single prediction model to make predictions may ignore the uncertainty inherent in the single prediction model. Thus, the ensemble of prediction models should be used for inference rather than employing a single prediction model. In this manner, the uncertainty of the prediction parameters will advantageously be determined with less error rates.

More specifically, the BMA approach does not only determine the uncertainty of the prediction parameters through prior probability distribution, but also determines the uncertainty of each prediction model with regard to performing a correct analysis and delivering results that are less prone to error(s). The weights of each prediction model are calculated based on posterior probability of each prediction model, in which prediction models with higher probability obtains more weight while prediction models with lower probability obtains less weight.

In one or more embodiments disclosed herein, for example, with four (n) prediction parameters (e.g., region, sub-region, AR_time, and, AR_diff, etc.), there will be sixteen ($2^n$) possible prediction models. Furthermore, assume that the uncertainty of AR_time is the parameter of interest ($Y^*$). For this purpose, the posterior probability distribution of $Y^*$ is obtained as a weighted average of probability distributions for $Y^*$ under each of the prediction model. Similarly, a posterior expected value of $Y^*$ can be calculated by using model specific expectations weighted by their posterior probabilities. Because the weights are the probabilities and have to sum to one, if the best prediction model under the BMA approach has posterior probability equal to one, all of the weight will be placed on that single prediction model. In this specific condition, using the BMA approach will be equivalent to selecting the best prediction model with the higher posterior probability. However, if there were several prediction models that obtain substantial posterior probability, they would all be included in the inference and account for the uncertainty of each prediction model.

In one or more embodiments disclosed herein, if the posterior probability of $Y^*$ is equal to one (1), this posterior probability illustrates that the BMA approach is 100% certain that $Y^*$ should be included into the prediction model. Further, if the posterior probability of region is equal to 0.31, this posterior probability illustrates that the BMA approach is 31% certain that region should be included into the prediction model. Thus, the region may be included to the prediction model as a prediction parameter.

Those skilled in the art will appreciate that while the uncertainty of the prediction parameters is determined using the BMA approach, any kind of forecasting model (e.g., neural network based models) implementing a similar approach and providing similar results as that of the BMA approach may be used to determine the uncertainty of the prediction parameters without departing from the scope of the embodiments disclosed herein.

Continuing the discussion of FIG. 2.1, output of the posterior probability prediction module (208) (i.e., information related to uncertainty of the prediction parameters) and output of the identification module (206) (i.e., significant variables identified from the dataset) are sent to an optimization module (210). In one or more embodiments disclosed herein, the optimization module (210) may perform the data prediction by minimizing randomness and uncertainty of the dataset (202). To perform the data prediction, the optimization module (210) uses a predictor model (e.g., an XGBoost model), a linear fitting model (e.g., a multivariate adaptive regression splines (MARS) model), and the above-discussed BMA approach. Additional details regarding the operation of the MARS model and the XGBoost model are described below in reference to FIG. 2.2.

Turning now to FIG. 2.2, FIG. 2.2 shows a diagram of the identification module (206) in accordance with one or more embodiments disclosed herein. In one or more embodiments disclosed herein, the identification module (206) includes a linear fitting model (212) and a predictor model (214).

In one or more embodiments disclosed herein, the linear fitting model (e.g., the MARS model) (212) and the predictor model (e.g., the XGBoost model) (214) are combined to generate a MARS-XGBoost model. In one or more embodiments disclosed herein, the seasonality of the dataset is predicted using the MARS-XGBoost model, in which the linear fitting ability of the MARS model and the nonlinear mapping ability of the XGBoost model are combined. Although the MARS and XGBoost models are used as specific examples of the linear fitting model (212) and the predictor model (214), respectively, one of ordinary skill in the art would appreciate that other models achieving similar results may be used without departing from the scope of one or more embodiments disclosed herein.

In one or more embodiments disclosed herein, significant variables are identified from the dataset using a multivariate adaptive regression splines (MARS) model (e.g., 202, FIG. 2.1). By using the MARS model, interaction(s) between the significant variables in the linear part(s) of the dataset are predicted. Further, with the help of the XGBoost model, interaction(s) between the significant variables in the nonlinear part(s) of the dataset (e.g., residuals of the MARS model) are predicted. Other models for determining significant variables in a dataset may be used without departing from the disclosure.

In one or more embodiments disclosed herein, the linear fitting model (212) may be a non-parametric regression model that generates multiple linear regression models across a range of predictor values. The linear fitting model (212) performs this process by partitioning the given data and runs a linear regression model on each partition. In one or more embodiments disclosed herein, the linear fitting model (212) generates the linear regression model in two steps. In the first step, the linear fitting model (212) generates a collection of basis functions, in which the range of the predictor values is divided into several groups. For each group, an individual linear regression is modeled and the connections between the individual regression lines are named as "knots". Then, as still part of the first step, the linear fitting model (212) automatically searches for the best locations to place the knots, in which each knot has a pair of basis functions.

In one or more embodiments disclosed herein, these basis functions may define a relationship between an environmental variable and a response. For example, as a first basis function, max(0, environmental variable–knot) illustrates that the first basis function takes the maximum value between two options: (i) 0 or (ii) the result of environmental variable–knot. As a second basis function, max(0, knot–environmental variable) has the opposite form of the first basis function.

In the case where the environmental value at the knot is 11: (i) For the first basis function, for any value below 11, the result of 'environmental variable–knot' will be a negative number (i.e., a number smaller than 0), thus, the outcome of the basis function will be 0. This illustrates that the outcome of the first basis function is 0 for all the environmental values up to the knot, while for all values after the knot, the outcome of the first basis function will be 'environmental variable–11'. (ii) Because the second basis function has the opposite form of the first basis function, the outcome of the second basis function for all the environmental values after the knot will be 0, while the outcome of the second basis function for all the environmental values before the knot will be '11–environmental value'.

Next, in the second step, the linear fitting model (212) generates a least squares model for the basis functions. In this manner, the linear fitting model (212) can prevent overfitting of the dataset by iteratively removing the basis functions that contribute the least to the model fit.

Continuing the discussion of FIG. 2, in one or more embodiments disclosed herein, the XGBoost model may repeatedly generate new models and combine them into an ensemble model. Initially, the XGBoost model generates the first model and calculates the error for each observation in the dataset (202). For example, at first, the XGBoost model provides a prediction and then subtracts the prediction from the actual data in the dataset (202). This difference between the prediction and the actual data in the dataset (202) illustrates an error in the prediction. Based on the error(s), the XGBoost model generates a new model to predict those errors. Following, the prediction from this model is added to the ensemble of models to improve the XGBoost model generalization for optimization. In this manner, the XGBoost model provides regularization terms so that overfitting of training data (e.g., data from the dataset (202) that is used to train the ML model or algorithm) can be prevented.

In one or more embodiments disclosed herein, to train the ML model (e.g., the XGBoost model), 70% of the dataset (202) is used, in which the remaining 30% of the dataset is used to perform the data prediction. The 70%-30% dataset splitting ratio is specifically selected to prevent possible overfitting issues and to have a stable ML model. Those skilled in the art will appreciate that while the 70%-30% dataset splitting ratio is selected, any other dataset splitting ratio may be selected to perform the data prediction without departing from the scope of the embodiments disclosed herein.

FIGS. 3.1 and 3.2 show a method to perform data prediction in accordance with one or more embodiments disclosed herein. While the various steps in the method are presented and described sequentially, those skilled in the art will appreciate that some or all of the steps may be executed in different orders, may be combined or omitted, and some or all steps may be executed in parallel without departing from the scope of the embodiments disclosed herein.

Turning now to FIG. 3.1, the method shown in FIG. 3.1 may be performed by, for example, the prediction parameter engineering module (e.g., 204, FIG. 2.1), the identification module (e.g., 206, FIG. 2.1), the posterior probability prediction module (e.g., 208, FIG. 2.1), and the optimization module (e.g., 210, FIG. 2.1). The components of the system illustrated in FIG. 1 may also contribute to the performance of the method shown in FIG. 3.1 without departing from the scope of the embodiments disclosed herein.

In Step 300, a data prediction request (e.g., a data prediction performance request) from a client device (not shown) is received. In one or more embodiments disclosed herein, the data prediction request from the client device may be received via a GUI displayed on a display of a computing device (e.g., 400, FIG. 4). The received request may include: (i) information identifying the dataset (e.g., 104, FIG. 1; 202, FIG. 2.1) stored in the storage (e.g., a name of the dataset, a folder path specifying a location of the dataset in the storage, etc.); (ii) information identifying a plurality of prediction features (e.g., prediction feature A (106A)-prediction feature N (106N), FIG. 1) in the dataset; and (iii) information identifying an analyzer (e.g., 108, FIG. 1) stored in the storage (e.g., a name assigned to the analyzer, a folder path specifying a location of the analyzer in the storage, etc.). The received data prediction request may include other details related to the dataset without departing from the scope of the embodiments disclosed herein.

In one or more embodiments disclosed herein, the analyzer may be pre-stored in the storage. For example, the computing device may be a computing device specifically configured for: (i) training the algorithm of the analyzer and (ii) evaluating the dataset using the trained analyzer algorithm. Alternatively, the analyzer may be obtained from an external source (e.g., a storage on the network, an external storage device, etc.).

In Step 302, upon receiving the data prediction request from the client device, the dataset that is going to be used to generate the prediction model is obtained (e.g., from a storage (e.g., 102, FIG. 1)). In one or more embodiments disclosed herein, the dataset may be in any size and any format (e.g., a zip file, a folder including individual files of each component of the dataset, etc.). Further, the dataset may include a plurality of prediction features (e.g., prediction feature A (106A), prediction feature N (106N), FIG. 1). Those skilled in the art will appreciate that while the dataset is obtained from a storage in Step 302, the dataset may be obtained from any source, e.g., a local computer, a network, etc., without departing from the scope of the embodiments disclosed herein.

In Step 304, randomness and uncertainty inherent in the dataset are determined. In one or more embodiments disclosed herein, the randomness and uncertainty inherent in the dataset are determined by the analyzer. To perform the determination, the analyzer may be configured to employ an ADF test. In one or more embodiments disclosed herein, the ADF test captures the properties of the dataset, such as mean and standard deviation, and determines whether those properties are changing over time.

While performing the test, the ADF algorithm of the ADF test assumes that the dataset is an autoregressive one (AR1) process, in which the current value of the dataset is based on the immediately preceding value of the dataset (e.g., the dataset is a linear function of itself lagged one time period in the past). For example, a null hypothesis (H_0) for the ADF test, which is a coefficient of the lagged one version of the dataset, is equal to 1. This illustrates that the dataset has a unit root, and a graphical visualization of the dataset will show that the dataset is non-stationary. As an alternative hypothesis for the ADF test, H_1 is less than 1, meaning that the dataset has no unit root and that the graphical visualization of the dataset will show the dataset is stationary. When the null hypothesis is true, the dataset will be equal to a constant+a coefficient (e.g., a normally distributed random sampling). This illustrates that under the null hypothesis, the dataset is stationary. More specifically, if the outcome of the calculation process shows that probability value (p-value), which is a measure of the probability of obtaining the observed difference in the outcome, is smaller than 0.05, the dataset has a unit root and it is non-stationary. Otherwise, if p-value<=0.05, the dataset has no unit root and it is stationary.

For a more complicated dataset (e.g., a dataset that is not an AR1 process), the null hypothesis and the alternative hypothesis for the complicated dataset will be exactly the same for the AR1 process based dataset. In this manner, using the same calculation process, the randomness and uncertainty of the more complicated dataset can also be determined.

Those skilled in the art will appreciate that while the ADF test is used to determine randomness and uncertainty of the dataset, any other test or algorithm able to produce similar results may be used to determine randomness and uncertainty of the dataset without departing from the scope of the embodiments disclosed herein.

In Step 306, prediction parameters are generated using the dataset. In one or more embodiments disclosed herein, the prediction parameters may be generated by the prediction parameter engineering module. As discussed above in reference to FIG. 2.1, the prediction parameters may include, but they are not limited to: region, sub-region, AR_time, AR_diff, etc. Further, the prediction parameter engineering module sends the prediction parameters to the identification module and to the posterior probability prediction module for the next steps of the data prediction method.

Continuing the discussion of FIG. 3.1, in Step 308, significant variables in the dataset are identified. In one or more embodiments disclosed herein, the identification module may identify the significant variables in the dataset using the MARS model. For example, AR_time is identified as a significant variable, because the dataset (AR) was on a weekly basis. Then, this time factor is multiplied with the dataset and peak values from the resulting data are obtained. In this example, other prediction parameters (e.g., region, sub-region, etc.) may have no significant effect on the dataset, because they are not time-related prediction parameters. Details regarding the operation of the MARS model are described above in reference to FIGS. 2.1 and 2.2.

In Step 310, based on the significant variables, seasonality of the dataset may be predicted. In one or more embodiments disclosed herein, the seasonality of the dataset may be predicted using the MARS-XGBoost model. Details regarding the operation of the MARS-XGBoost model are described above in reference to FIGS. 2.1 and 2.2.

In Step 312, uncertainty of the prediction parameters are obtained. In one or more embodiments disclosed herein, the uncertainty of the prediction parameters may be obtained by the BMA approach discussed above in reference to FIG. 2.1. More specifically, to be able to determine uncertainty of the prediction parameters with less error rates, an ensemble of prediction models are used for inference rather than employing a single prediction model. Further, the weights of each prediction model are calculated based on the posterior probability of each prediction model, where the models with higher probability obtains more weight while the models with lower probability obtains less weight.

Turning now to FIG. 3.2, the method shown in FIG. 3.2 may be performed by, for example, the identification module (e.g., 206, FIG. 2.1), the posterior probability prediction module (e.g., 208, FIG. 2.1), and the optimization module (e.g., 210, FIG. 2.1). The components of the system illustrated in FIG. 1 may also contribute to the performance of the method shown in FIG. 3.2 without departing from the scope of the embodiments disclosed herein.

In Step 314, the data prediction is performed by minimizing randomness and uncertainty of the dataset. In one or more embodiments disclosed herein, the data prediction may be performed by the optimization module, in which the optimization module includes the combination of the XGBoost model, the MARS model, and the BMA approach as a combined XGBoost model. For a given dataset (e.g., non-stationary financial time series data), the combined XGBoost model employed by one or more embodiments advantageously provides more robust and stable prediction results than the heuristic models with lower error rates (e.g., <5%). As discussed above, the heuristic models are mathematically unstable and lack of providing a deeper determination of the influence of the significant variables to the data prediction.

In Step 316, the data prediction is displayed to a user on a GUI. In one or more embodiments disclosed herein, the data prediction may be displayed on a display of a display engine (not shown), in which the display engine is operatively connected to a computing device (e.g., 400, FIG. 4). The display engine may be implemented using hardware, software, or any combination thereof.

In one or more embodiments disclosed herein, the display engine may cause the display to show the data prediction to a user of the computing system, in which the data prediction may be displayed in any visual format which would allow the user to easily read and parse through all of the generated information.

In one or more embodiments disclosed herein, the display engine may receive the outputs generated by the prediction module (e.g., 110, FIG. 1) and the visualization module (112), and the display engine may aggregate these outputs into a user-friendly display format (e.g., an application including subtabs for each of the prediction result and the one or more prediction feature visualization outputs).

Turning now to FIG. 4, FIG. 4 shows a diagram of a computing device in accordance with one or more embodiments disclosed herein.

In one or more embodiments disclosed herein, the computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), an input device(s) (410), an output device(s) (408), and numerous other elements (not shown) and functionalities. Each of these components is described below.

In one or more embodiments, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN), such as the Internet, mobile network, or any other type of network) and/or to another device, such as another computing device.

In one or more embodiments, the computing device (400) may include one or more output devices (408), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

The problems discussed above should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for performing data prediction, the method comprising:

receiving a data prediction request from a user of a client device via a graphical user interface (GUI), wherein the data prediction request comprises information identifying a dataset and information identifying a prediction feature in the dataset;

obtaining, in response to the data prediction request, the dataset, wherein the dataset is related to a merchant, wherein the prediction feature affects an event of a plurality of events demonstrated by the dataset, wherein the plurality of events comprises changes in accounts receivable;

determining, by a circuitry using an augmented dickey fuller test on the dataset, that the dataset has uncertainty;

in response to determining that the dataset has uncertainty:

generating prediction parameters using the dataset, wherein the prediction parameters comprise region, sub-region, time-based accounts receivables of the merchant, and time-based accounts receivables difference of the merchant;

identifying significant variables in the dataset;

determining uncertainty of the prediction parameters using an ensemble of prediction models;

performing, based on the significant variables and the uncertainty of the prediction parameters, the data prediction using a combination of an extreme gradient boost (XGBoost) model, a multivariate adaptive regression splines (MARS) model, and a Bayesian model averaging (BMA) approach to minimize the uncertainty of the dataset; and displaying the data prediction to the user using the GUI, wherein the GUI is displayed on a display of a computing device, wherein the display shows the data prediction in a user-friendly visual format that would allow the user to easily read and parse the data prediction, wherein the user-friendly visual format comprises subtabs corresponding to each data prediction of a plurality of data predictions, wherein the plurality of data predictions comprises the data prediction.

2. The method of claim 1, further comprising:

prior to determining the uncertainty of the prediction parameters, obtaining posterior probabilities of the ensemble of prediction models.

3. The method of claim 2, wherein the posterior probabilities of the ensemble of prediction models are obtained using the BMA approach.

4. The method of claim 1, wherein the significant variables in the dataset are identified using the MARS model.

5. The method of claim 4, wherein the seasonality of the dataset is predicted using the XGBoost model and the MARS model.

6. The method of claim 1, wherein the method further comprises:

obtaining posterior probabilities of an ensemble of prediction models, wherein the significant variables in the dataset are identified using the MARS model;

wherein the posterior probabilities of the ensemble of prediction models are obtained using the BMA approach;

wherein the seasonality of the dataset is predicted using the XGBoost model and the MARS model; and wherein the data prediction is performed by an optimization module, wherein the optimization module comprises the MARS model, the BMA approach, and the XGBoost model.

7. A non-transitory computer readable medium comprising computer readable program code, which when executed by a computer processor enables the computer processor to perform a method for performing data prediction, the method comprising:

receiving a data prediction request from a user of a client device via a graphical user interface (GUI), wherein the data prediction request comprises information identifying a dataset and information identifying a prediction feature in the dataset;

obtaining, in response to the data prediction request, the dataset, wherein the dataset is related to a merchant, wherein the prediction feature affects an event of a plurality of events demonstrated by the dataset, wherein the plurality of events comprises changes in accounts receivable;

determining, by a circuitry using an augmented dickey fuller test on the dataset, that the dataset has uncertainty;

in response to determining that the dataset has uncertainty:

generating prediction parameters using the dataset, wherein the prediction parameters comprise region, sub-region, time-based accounts receivables of the merchant, and time-based accounts receivables difference of the merchant;

identifying significant variables in the dataset;

determining uncertainty of the prediction parameters using an ensemble of prediction models;

performing, based on the significant variables and the uncertainty of the prediction parameters, the data prediction using a combination of an extreme gradient boost (XGBoost) model, a multivariate adaptive regression splines (MARS) model, and a Bayesian model averaging (BMA) approach to minimize the uncertainty of the dataset; and displaying the data prediction to the user using the GUI, wherein the GUI is displayed on a display of a computing device, wherein the display shows the data prediction in a user-friendly visual format that would allow the user to easily read and parse the data prediction, wherein the user-friendly visual format comprises subtabs corresponding to each data prediction of a plurality of data predictions, wherein the plurality of data predictions comprises the data prediction.

8. The non-transitory computer readable medium of claim 7, further comprising:

prior to determining the uncertainty of the prediction parameters, obtaining posterior probabilities of the ensemble of prediction models.

9. The non-transitory computer readable medium of claim 8, wherein the posterior probabilities of the ensemble of prediction models are obtained using the BMA approach.

10. The non-transitory computer readable medium of claim 7, wherein the significant variables in the dataset are identified using the MARS model.

11. The non-transitory computer readable medium of claim 10, wherein the seasonality of the dataset is predicted using the XGBoost model and the MARS model.

12. The non-transitory computer readable medium of claim 7, wherein the method further comprises:

obtaining posterior probabilities of an ensemble of prediction models, wherein the significant variables in the dataset are identified using the MARS model;

wherein the posterior probabilities of the ensemble of prediction models are obtained using the BMA approach;

wherein the seasonality of the dataset is predicted using the XGBoost model and the MARS model; and wherein the data prediction is performed by an optimization module, wherein the optimization module comprises the MARS model, the BMA approach, and the XGBoost model.

13. A system for performing data prediction, the system comprising:

a processor comprising circuitry;

memory comprising instructions, which when executed perform a method, the method comprising:

receiving a data prediction request from a user of a client device via a graphical user interface (GUI), wherein the data prediction request comprises information identifying a dataset and information identifying a prediction feature in the dataset;

obtaining, in response to the data prediction request, the dataset, wherein the dataset is related to a merchant, wherein the prediction feature affects an event of a plurality of events demonstrated by the dataset, wherein the plurality of events comprises changes in accounts receivable;

determining, by the circuitry using an augmented dickey fuller test on the dataset, that the dataset has uncertainty;

in response to determining that the dataset has uncertainty:

generating prediction parameters using the dataset, wherein the prediction parameters comprise region, sub-region, time-based accounts receivables of the merchant, and time-based accounts receivables difference of the merchant;

identifying significant variables in the dataset;

determining uncertainty of the prediction parameters using an ensemble of prediction models;

performing, based on the significant variables and the uncertainty of the prediction parameters, the data prediction using a combination of an extreme gradient boost (XGBoost) model, a multivariate adaptive regression splines (MARS) model, and a Bayesian model averaging (BMA) approach to minimize the uncertainty of the dataset; and displaying the data prediction to the user using the GUI, wherein the GUI is displayed on a display of a computing device, wherein the display shows the data prediction in a user-friendly visual format that would allow the user to easily read and parse the data prediction, wherein the user-friendly visual format comprises subtabs corresponding to each data prediction of a plurality of data predictions, wherein the plurality of data predictions comprises the data prediction.

14. The system of claim 13, further comprising:

prior determining uncertainty of the prediction parameters, obtaining posterior probabilities of the ensemble of prediction models.

15. The system of claim 14, wherein the posterior probabilities of the ensemble of prediction models are obtained using the BMA approach.

16. The system of claim 13, wherein the significant variables in the dataset are identified using the MARS model.

17. The system of claim 16, wherein the seasonality of the dataset is predicted using the XGBoost model and the MARS model.

\* \* \* \* \*